United States Patent
Kozuka et al.

(10) Patent No.: US 9,376,119 B2
(45) Date of Patent: Jun. 28, 2016

(54) VEHICLE-CENTER-OF-GRAVITY CONDITION DETERMINING APPARATUS AND VEHICLE BEHAVIOR CONTROL SYSTEM

(71) Applicants: Tomoyuki Kozuka, Shizuoka-ken (JP); Hideki Kato, Machida (JP)

(72) Inventors: Tomoyuki Kozuka, Shizuoka-ken (JP); Hideki Kato, Machida (JP)

(73) Assignee: TOYOTA JIDOSHA KABUSHIKI KAISHA, Aichi (JP)

(*) Notice: Subject to any disclaimer, the term of this patent is extended or adjusted under 35 U.S.C. 154(b) by 0 days.

(21) Appl. No.: 14/652,276

(22) PCT Filed: Feb. 8, 2013

(86) PCT No.: PCT/JP2013/053144
§ 371 (c)(1),
(2) Date: Jun. 15, 2015

(87) PCT Pub. No.: WO2014/122786
PCT Pub. Date: Aug. 14, 2014

(65) Prior Publication Data
US 2015/0367857 A1 Dec. 24, 2015

(51) Int. Cl.
*G06F 7/70* (2006.01)
*B60W 40/13* (2012.01)
*B60T 8/172* (2006.01)
*B60T 8/1766* (2006.01)

(52) U.S. Cl.
CPC ............ *B60W 40/13* (2013.01); *B60T 8/172* (2013.01); *B60T 8/1766* (2013.01); *B60W 2040/1307* (2013.01); *B60W 2040/1315* (2013.01); *B60W 2510/182* (2013.01)

(58) Field of Classification Search
USPC .......................................................... 701/70
See application file for complete search history.

(56) References Cited

U.S. PATENT DOCUMENTS

| | | | | |
|---|---|---|---|---|
| 5,284,385 A | * | 2/1994 | Muller | B60T 8/1766 303/113.5 |
| 6,027,183 A | * | 2/2000 | Katayose | B60T 8/1755 303/113.5 |
| 6,062,660 A | * | 5/2000 | Matsuno | B60T 8/1706 188/181 C |
| 2003/0218378 A1 | * | 11/2003 | Tanaka | B60T 8/1755 303/146 |
| 2005/0168059 A1 | * | 8/2005 | Nishikawa | B60T 8/3225 303/3 |
| 2005/0168063 A1 | * | 8/2005 | Tani | B60T 8/261 303/113.5 |
| 2014/0180552 A1 | * | 6/2014 | Giddens | B60T 8/306 701/70 |

FOREIGN PATENT DOCUMENTS

| | | |
|---|---|---|
| JP | 2006-117067 A | 5/2006 |
| JP | 2010-284990 A | 12/2010 |

* cited by examiner

*Primary Examiner* — Hussein A. Elchanti
(74) *Attorney, Agent, or Firm* — Sughrue Mion, PLLC (57) ABSTRACT

A vehicle-center-of-gravity condition determining apparatus includes: a rear wheel brake pressure change unit; a front wheel brake pressure detector; a rear wheel brake pressure detector; a rear wheel axle load estimating unit configured to estimate a rear wheel axle load based on a relationship between front and rear brake pressures detected during braking and a rear wheel axle load property of the rear wheel brake pressure change unit; and a vehicle-center-of-gravity condition determiner configured to determine a center of gravity condition of a vehicle in a vehicle width direction based on the estimated rear wheel axle load. The rear wheel axle load estimating unit is configured to estimate each of the rear wheel axle loads in a case where braking is performed in a state of at least two of during straight running, during right turning, and during left turning.

5 Claims, 6 Drawing Sheets

VEHICLE-CENTER-OF-GRAVITY CONDITION DETERMINING APPARATUS AND VEHICLE BEHAVIOR CONTROL SYSTEM

CROSS REFERENCE TO RELATED APPLICATIONS

This application is a National Stage of International Application No. PCT/JP2013/053144 filed Feb. 8, 2013, the contents of all of which are incorporated herein by reference in their entirety.

FIELD

The present invention relates to a vehicle-center-of-gravity condition determining apparatus, a vehicle behavior control system, and a vehicle-center-of-gravity condition determining method that determine a center of gravity condition of a vehicle.

BACKGROUND

A vehicle behavior control, a vehicle stability control (VSC) and the like, which controls a behavior of a vehicle by controlling at least braking power, performs a control assuming that a center of gravity of a vehicle, one of a parameter determining a controlled variable, is constant. Among the vehicles, there is a loading vehicle whose load significantly changes between a light load and the maximum load and whose center of gravity position changes between front and rear of the vehicle. Even if the vehicle behavior control is performed on such loading vehicle assuming that the center of gravity position is constant, there is a possibility of failing to provide sufficient control performance.

Conventionally, considering the change in the center of gravity position between front and rear of the vehicle caused by the load change between the light load and the maximum load, there is an apparatus that performs braking power control. For example, as disclosed in Patent Literature 1, when the rear wheel braking power reaches the rear wheel braking power in the ideal front-rear braking power distribution during the light load, if the rear wheel is not in a slip state, there is an apparatus that performs the braking power control to increase a distribution proportion of the rear wheel braking power.

CITATION LIST

Patent Literature

Patent Literature 1: Japanese Patent Application Laid-open No. 2010-284990

SUMMARY

Technical Problem

However, the loading vehicle can place a baggage at any given position not only in a vehicle front-rear direction but also in a vehicle width direction. In view of this, the center of gravity position changes in the vehicle front-rear direction and the vehicle width direction according to a position of loaded goods. The vehicle behavior control including the braking power control is demanded to be a control accommodating the center of gravity position in the vehicle width direction.

The present invention has been made in view of the above-described circumstances, and it is an object of the present invention to provide a vehicle-center-of-gravity condition determining apparatus, a vehicle behavior control system, and a vehicle-center-of-gravity condition determining method that can determine a center of gravity position state in the vehicle width direction.

Solution to Problem

To solve the above-described problem and achieve the above-described object, a vehicle-center-of-gravity condition determining apparatus according to the present invention includes: a rear wheel brake pressure change unit configured to change rear wheel brake pressure according to a rear wheel axle load; a front wheel brake pressure detector configured to detect brake pressure of a front wheel; a rear wheel brake pressure detector configured to detect brake pressure of the rear wheel at a downstream side with respect to the rear wheel brake pressure change unit; a rear wheel axle load estimating unit configured to estimate a rear wheel axle load based on a relationship between front and rear brake pressures detected during braking and a rear wheel axle load property of the rear wheel brake pressure change unit; and a vehicle-center-of-gravity condition determiner configured to determine a center of gravity condition of a vehicle in a vehicle width direction based on the estimated rear wheel axle load. The rear wheel axle load estimating unit is configured to estimate each of the rear wheel axle loads in a case where braking is performed in a state of at least two of during straight running, during right turning, and during left turning.

Moreover, in the vehicle-center-of-gravity condition determining apparatus, it is preferable that the center of gravity condition of the vehicle in the vehicle width direction is an amount of displacement of a center of gravity position of a vehicle in the vehicle width direction, the rear wheel axle load estimating unit is configured to estimate the rear wheel axle loads in a case where braking is performed in a state of during left turning and during right turning as respective first rear wheel axle load and second rear wheel axle load, and the vehicle-center-of-gravity condition determining apparatus is configured to estimate the amount of displacement of the center of gravity position of the vehicle in the vehicle width direction based on the first rear wheel axle load and the second rear wheel axle load.

Moreover, a vehicle behavior control system according to the present invention includes: the above-described vehicle-center-of-gravity condition determining apparatus; and a vehicle behavior controller configured to control at least braking power based on the center of gravity condition of the vehicle in the vehicle width direction to control a vehicle behavior.

Moreover, a vehicle-center-of-gravity condition determining method according to the present invention includes: a step of changing rear wheel brake pressure according to a rear wheel axle load; a step of detecting brake pressure of a front wheel; a step of detecting brake pressure of the rear wheel at a downstream side with respect to a rear wheel brake pressure change unit, the rear wheel brake pressure change unit being configured to change brake pressure of a rear wheel according to the rear wheel axle load; a step of estimating a rear wheel axle load based on a relationship between front and rear brake pressures detected during braking and a rear wheel axle load property of the rear wheel brake pressure change unit; and a step of determining a center of gravity condition of a vehicle in a vehicle width direction based on the estimated rear wheel axle load. The rear wheel axle load is estimated in a case where braking is performed in a state of at least two of during straight running, during right turning, and during left turning.

Advantageous Effects of Invention

The vehicle-center-of-gravity condition determining apparatus and the vehicle-center-of-gravity condition determining method according to the present invention provides an advantageous effect that can determine a center of gravity condition of a vehicle in a vehicle width direction with a simple configuration. The vehicle behavior control system according to the present invention can control a vehicle behavior based on a detected center of gravity condition of the vehicle in the vehicle width direction. Accordingly, even if the center of gravity condition of the vehicle in the vehicle width direction changes, the vehicle behavior control system provides an advantageous effect of ensuring appropriate control of the vehicle behavior.

DESCRIPTION OF EMBODIMENTS

A description will be given of configurations (embodiments) embodying the present invention in detail by referring to the accompanying drawings. The contents of the following embodiments do not limit the invention. The constituent elements described in the following include the constituent elements that will readily occur to those skilled in the art or what is called equivalent range thereof. Furthermore, the following configuration can be appropriately combined. Various omissions, substitutions, or changes disclosed herein may be made without departing from the gist of the present invention.

First Embodiment

Figure 1:
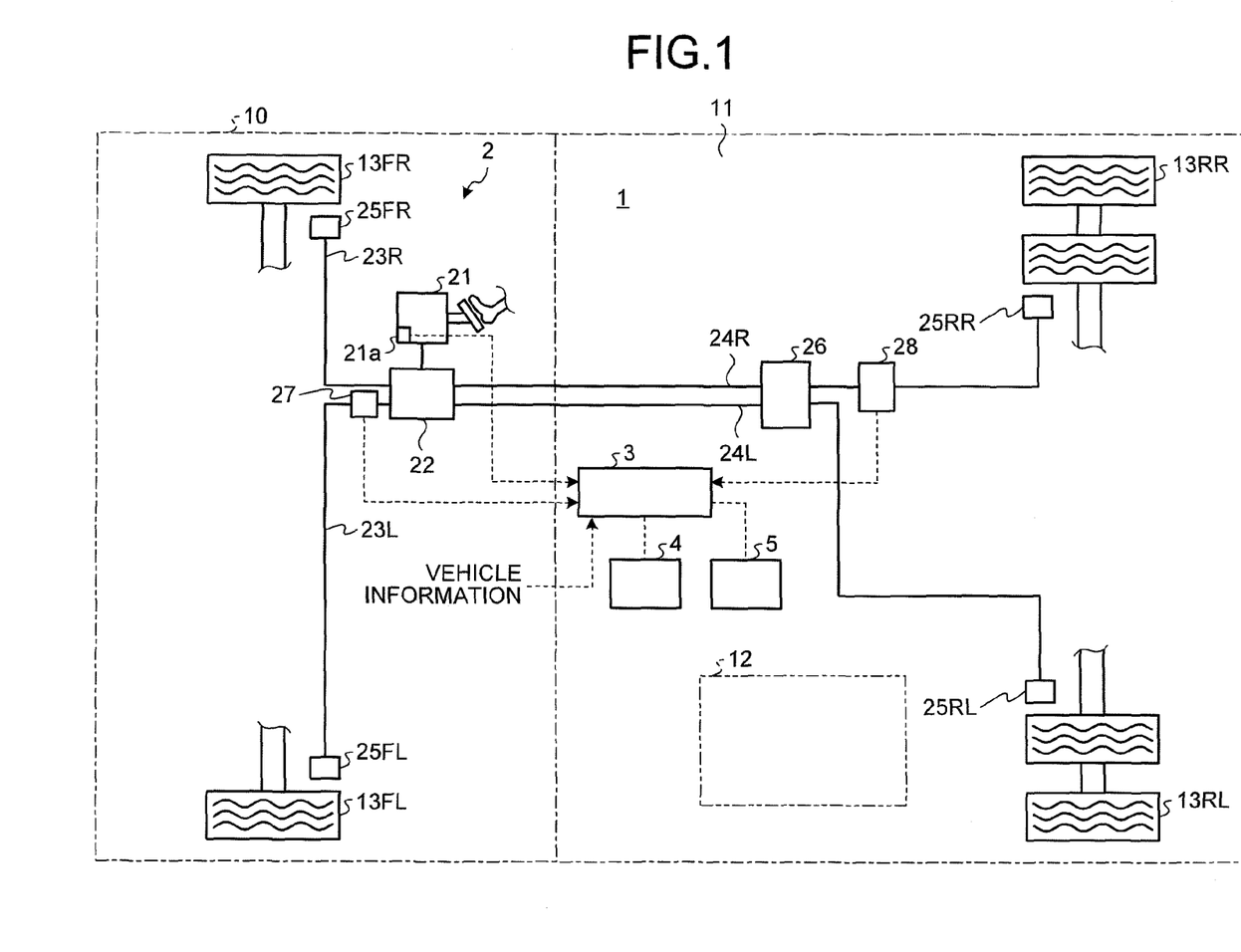
FIG. 1 illustrates an exemplary configuration of a vehicle that includes a vehicle-center-of-gravity condition determining apparatus according to a first embodiment.
Figure 2:
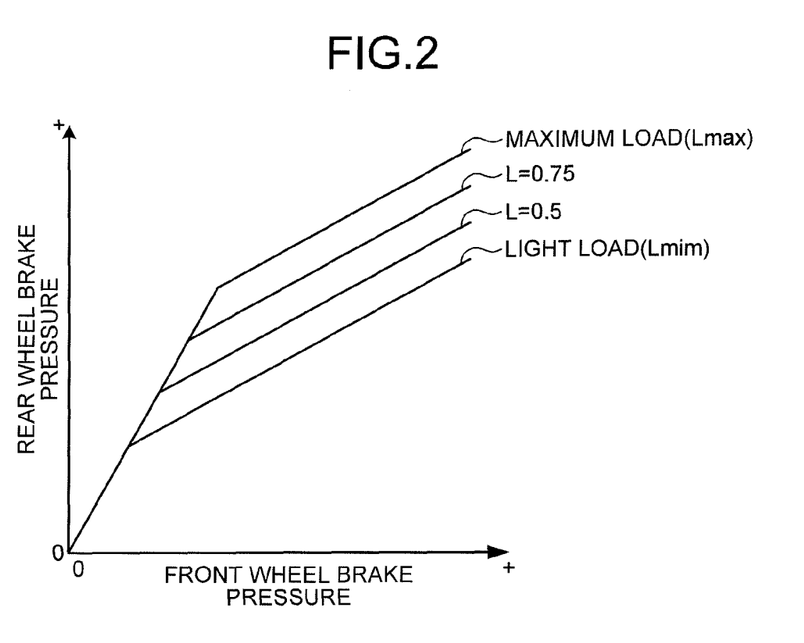
FIG. 2 illustrates a relationship between front wheel brake pressure, rear wheel brake pressure, and a load capacity.
Figure 3:
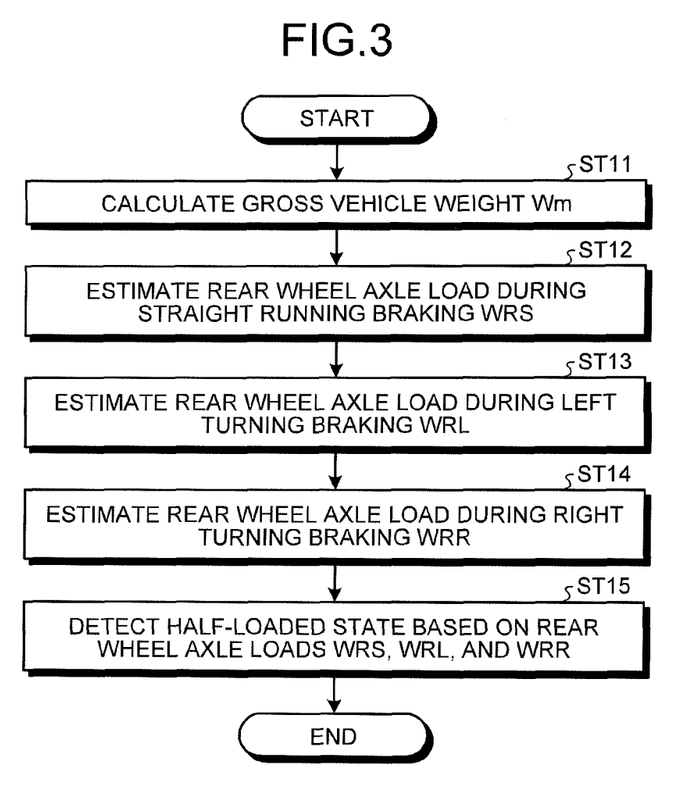
FIG. 3 is a flowchart illustrating a vehicle-center-of-gravity condition determining method of the vehicle-center-of-gravity condition determining apparatus according to the first embodiment.
Figure 4:
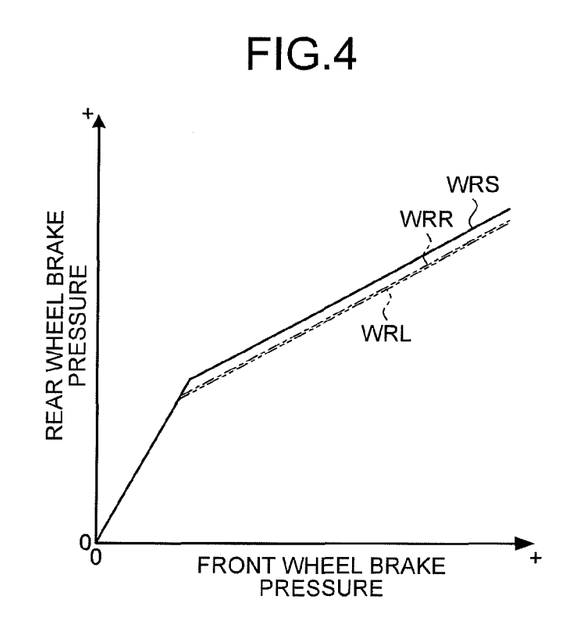
FIG. 4 illustrates a relationship between the front wheel brake pressure, the rear wheel brake pressure, and a rear wheel axle load during center loading.
Figure 5:
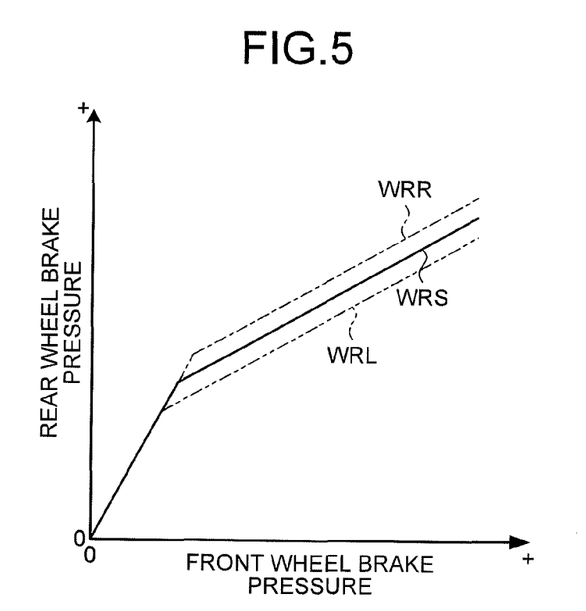
FIG. 5 illustrates a relationship between the front wheel brake pressure, the rear wheel brake pressure, and the rear wheel axle load during left side loading.
Figure 6:
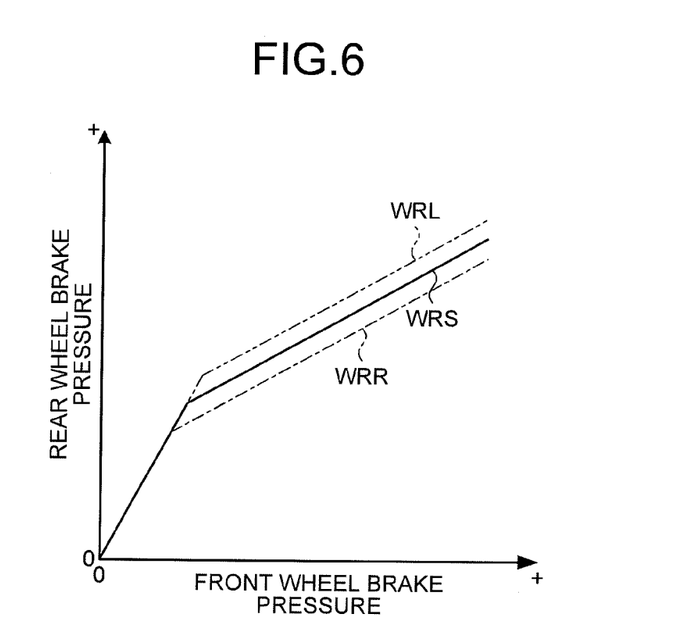
FIG. 6 illustrates a relationship between the front wheel brake pressure, the rear wheel brake pressure, and the rear wheel axle load during right side loading.

The following describes a vehicle-center-of-gravity condition determining apparatus 1 according to the first embodiment. FIG. 1 illustrates an exemplary configuration of a vehicle that includes a vehicle-center-of-gravity condition determining apparatus according to an embodiment. FIG. 2 illustrates a relationship between front wheel brake pressure, rear wheel brake pressure, and a load capacity. FIG. 3 is a flowchart illustrating a vehicle-center-of-gravity condition determining method of the vehicle-center-of-gravity condition determining apparatus according to the embodiment. FIG. 4 illustrates a relationship between the front wheel brake pressure, the rear wheel brake pressure, and a rear wheel axle load during center loading. FIG. 5 illustrates a relationship between the front wheel brake pressure, the rear wheel brake pressure, and the rear wheel axle load during left side loading. FIG. 6 illustrates a relationship between the front wheel brake pressure, the rear wheel brake pressure, and the rear wheel axle load during right side loading.

Here, this embodiment describes the case where a deck 11 is disposed at a rear of the vehicle and the vehicle-center-of-gravity condition determining apparatus 1 is disposed at a loading vehicle 10, a track, a van, a cargo vehicle, a dump truck, and the like, that can load loaded goods 12 on the deck 11. However, this should not be construed in a limiting sense. The vehicle-center-of-gravity condition determining apparatus 1 is applicable to all vehicles as long as the vehicle includes a rear wheel brake pressure change unit. The rear wheel brake pressure change unit changes brake pressure at the rear wheel according to a rear wheel axle load, which will be described later. The "right and left" in the following description matches the right and left in the vehicle width direction when viewed from the forward direction of the loading vehicle 10.

The vehicle-center-of-gravity condition determining apparatus 1 includes an LSPV 26, a front wheel brake pressure sensor 27, and a rear wheel brake pressure sensor 28, which are included in a braking device 2, and an ECU 3.

The braking device 2 generates braking power in the loading vehicle 10 and is described as a hydraulic braking device in this embodiment. However, this should not be construed in a limiting sense. The braking device 2 may be any of a pneumatic-hydraulic braking device or a pneumatic braking device. The braking device 2 includes a master cylinder 21, a brake actuator 22, right and left front wheel tubes 23R and 23L, right and left rear wheel tubes 24R and 24L, wheel cylinders 25FL, 25FR, 25RL, and 25RR disposed respectively corresponding to wheels 13FL, 13FR, 13RL, and 13RR, the LSPV 26, the front wheel brake pressure sensor 27, the rear wheel brake pressure sensor 28, and a brake ECU (not illustrated).

The master cylinder 21 generates fluid pressure according to an operation of a brake pedal by a driver. Then, the master cylinder 21 supplies wheel cylinders 25FR to 25RL with the generated fluid pressure via the right and left front wheel tubes 23R and 23L and the right and left rear wheel tubes 24R and 24L, respectively. The master cylinder 21 includes a master cylinder pressure sensor 21a. The master cylinder pressure sensor 21a detects the fluid pressure, namely, master cylinder pressure Pm. The master cylinder pressure sensor 21a outputs the detected master cylinder pressure Pm to the electrically coupled brake ECU and the ECU 3. The fluid pressure may be directly generated by pedal effort generated by the operation of the brake pedal. The fluid pressure may be indirectly generated according to the amount of operation of the brake pedal.

The brake actuator 22 can individually (right and left front wheels 13FR and 13FL and right and left rear wheels 13RR and 13RL, right front rear wheels 13FR and 13RR and left front rear wheels 13FL and 13RL, a left front wheel and a right rear wheel 13FL and 13RR, and a right front wheel and a left rear wheel 13FR and 13RL) or independently adjust the braking power generated at respective wheels 13FR to 13RL, a vehicle stability control (VSC) control, which is a lateral slippage suppressing control by the ECU 3, and the like, and an antilock brake system (ABS) control, which is a brake lock suppressing control by the brake ECU. The brake actuator 22 is disposed between the master cylinder 21 and respective wheel cylinders 25FL to 25RR. The brake actuator 22 is coupled to the wheel cylinder 25FL on the left front wheel side by a left front wheel tube 23L. The brake actuator 22 is coupled to the wheel cylinder 25FR on a right front wheel side by a right front wheel tube 23R. The brake actuator 22 is coupled to the wheel cylinder 25RL on the left rear wheel side by a left rear wheel tube 24L. The brake actuator 22 is coupled to the wheel cylinder 25RR on the right rear wheel side by a right rear wheel tube 24R. The brake actuator 22 includes an oil pump, an oil reservoir, and various valves (a fluid holding valve, a pressure reducing valve, and the like) (not illustrated). The brake actuator 22 can control cylinder pressure Ps, which is a pressure of each of the wheel cylinders 25FL to 25RR, to individually or independently adjust the braking power as described above. Here, in normal operation, that is, in a state where the braking power control, the VSC control, the ABS control, and the like, is not performed, the brake actuator 22 can supply the wheel cylinders 25FR and 25FL on right and left front wheel sides with front wheel brake pressure Pf (the cylinder pressure Ps on the right and left front wheel sides) and can supply the wheel cylinders 25RR and 25RL on the right and left rear wheel sides with rear wheel brake pressure Pr (the cylinder pressure Ps on the right and left rear wheel sides) such that a braking power distribution to the right and left front wheels 13FR and 13FL and the right and left rear wheels 13RR and 13RL becomes a predetermined distribution.

Respective wheel cylinders 25FL to 25RR are disposed at respective wheels 13FL to 13RR. The wheel cylinders 25FL to 25RR are hydraulic actuators to drive a braking mechanism that generates the braking power. The braking mechanism is, for example, a disc brake mechanism configured by a disc rotor and a brake pad or a drum brake mechanism.

The load-sensing proportioning valve (LSPV) 26 is a rear wheel brake pressure change unit. The LSPV 26 changes the rear wheel brake pressure Pr according to the rear wheel axle load WR, that is, changes the braking power distribution to the right and left front wheels 13FR and 13FL and the right and left rear wheels 13RR and 13RL according to a rear wheel axle load WR. The LSPV 26 is disposed between the brake actuator 22 and the wheel cylinders 25RL and 25RR on the rear wheel side. The LSPV 26 controls a flow rate at the right and left rear wheel tubes 24R and 24L to change the rear wheel brake pressure Pr. Here, when loading the loaded goods 12 on the deck 11, a rear wheel load of the loading vehicle 10 changes. Additionally, a distance between the right and left rear wheels 13RR and 13RL and the deck 11 becomes shorter compared with a state where the loaded goods 12 are not loaded on the deck 11. Even if a passenger gets in the driver's seat and the front passenger seat of the loading vehicle 10, a front wheel load changes but the rear wheel load hardly changes. The LSPV 26 is, for example, disposed between a vehicle body and a rear axle (not illustrated). Based on a change in a distance between the vehicle body and the rear axle according to the load of the loaded goods 12 loaded on the deck 11, that is, the change in the rear wheel load, the LSPV 26 controls the flow rate at the right and left rear wheel tubes 24R and 24L to change the rear wheel brake pressure Pr. As illustrated in FIG. 2, the LSPV 26 configures setting such that the change in the rear wheel brake pressure Pr to the front wheel brake pressure Pf becomes constant (first-half-front-rear brake pressure distribution) from when the brake pressure is generated until the front wheel brake pressure Pf reaches to any given change point according to a load capacity L. When the front wheel brake pressure Pf exceeds the any given change point according to the load capacity L, the LSPV 26 configures setting such that the distribution is different from the first-half-front-rear brake pressure distribution (second-half-front-rear brake pressure distribution). The second-half-front-rear brake pressure distribution is set such that the amount of change of the rear wheel brake pressure Pr to the amount of change of the front wheel brake pressure Pf becomes smaller compared with the first-half-front-rear brake pressure distribution. Accordingly, in the case of large master cylinder pressure Pm, that is, in the braking state when the driver strongly depresses the brake pedal, the braking power heightens a ground contact pressure of the right and left front wheels 13FR and 13FL to a road surface. Further, the ground contact pressure of the right and left rear wheels 13RR and 13RL to the road surface becomes low. This possibly slips the right and left rear wheels 13RR and 13RL in the first-half-front-rear brake pressure distribution. Therefore, the LSPV 26 sets the front-rear brake pressure distribution where the rear wheel brake pressure Pr decreases in the second-half-front-rear brake pressure distribution, thus restraining the slip of the right and left rear wheels 13RR and 13RL. The front wheel brake pressure Pf at the any given change point according to the load capacity L increases in association with an increase in the load capacity L, for example, an increase in the order of the light load (L=min), 50% of the maximum load (L=0.5), 75% of the maximum load (L=0.75), and the maximum load (L=max=1). However, the amount of change of the rear wheel brake pressure Pr to the amount of change of the front wheel brake pressure Pf is constant regardless of the load capacity L. The LSPV 26 may be disposed on any of the center, the left side, or on the right side in the vehicle width direction. In this embodiment, the LSPV 26 is disposed at the center (approximately the center). In the case where the LSPV 26 is disposed on the left side or the right side, compared with the case where the LSPV 26 is disposed at the center of the vehicle width direction, a distance between the right and left rear wheels 13RR and 13RL and the deck 11 when a roll occurs due to the right-left turning becomes large. This allows increasing the change in the estimated rear wheel axle load WR during braking.

The front wheel brake pressure sensor 27 is a front wheel brake pressure detector to detect the front wheel brake pressure Pf. The front wheel brake pressure sensor 27 is, as illustrated in FIG. 1, disposed in the middle of the left front wheel tube 23L in this embodiment. The front wheel brake pressure sensor 27 detects the cylinder pressure Ps of the wheel cylinder 25FL on the left front wheel side as the front wheel brake pressure Pf. The front wheel brake pressure sensor 27 outputs the detected front wheel brake pressure Pf to the brake ECU and the ECU 3. The front wheel brake pressure sensor 27 may be disposed in the middle of the right front wheel tube 23R or may be preliminary built into the brake actuator 22. The front wheel brake pressure sensor 27 may detect any one of or both of the cylinder pressure Ps of the wheel cylinders 25FR and 25FL on the right and left front wheel side.

The rear wheel brake pressure sensor 28 is a rear wheel brake pressure detector to detect the rear wheel brake pressure Pr. Here, the rear wheel brake pressure sensor 28 is disposed between the LSPV 26 and the wheel cylinder 25RR on the right front wheel side at the right rear wheel tube 24R. That is, the rear wheel brake pressure sensor 28 is disposed on the downstream side with respect to the LSPV 26 (the side of supplying the fluid pressure, opposite side from the brake actuator 22 and the master cylinder 21 sides, the upstream side with respect to the LSPV 26, that is, the side of generating the fluid pressure). The rear wheel brake pressure sensor 28 detects the rear wheel brake pressure Pr at the downstream side with respect to the LSPV 26. The rear wheel brake pressure sensor 28 detects the rear wheel brake pressure Pr changed by the LSPV 26.

The electronic control unit (ECU) 3 is a controller to determine the center of gravity condition of the vehicle in the vehicle width direction. The ECU 3 functions as a rear wheel axle load estimating unit and a vehicle-center-of-gravity condition determiner.

The ECU 3 estimates the rear wheel axle load WR based on the relationship between the front and rear brake pressures detected during braking and the rear wheel axle load property of the LSPV 26. In this embodiment, the ECU 3 estimates the rear wheel axle load WR based on the relationship between the front and rear brake pressures detected during braking, the load capacity L based on the rear wheel axle load property of the LSPV 26, and the rear wheel axle load during no-loading preliminary determined in the specification of the loading vehicle 10. The ECU 3 estimates the load capacity L from the relationship between the detected front wheel brake pressure Pf and rear wheel brake pressure Pr, namely, the front-rear brake pressure distribution, in particular, the second-half-front-rear brake pressure distribution. The ECU 3 adds the rear wheel axle load during no-loading to the estimated load capacity L to estimate the rear wheel axle load WR. This is based on the rear wheel axle load property where the rear wheel load during no-loading is added to a load property of the LSPV 26 that mechanically decides the front-rear brake pressure distribution according to the load capacity L (relationship between the second-half-front-rear brake pressure distribution and the load capacity L). The ECU 3 estimates the rear wheel axle load WR during braking at least two of during a straight running braking where the loading vehicle 10 performs braking in a straight running state, during a left turning braking where the loading vehicle 10 performs braking in a left turning state, and during a right turning braking where the loading vehicle 10 performs braking in a right turning state. That is, the ECU 3 estimates the rear wheel axle load WR in different vehicle running states during braking.

Here, the rear wheel axle load WR during braking changes according to the loaded position of the loaded goods 12 in the vehicle width direction. This is because that the right-left turning of the loading vehicle 10 generates the roll, unlike the straight running. If the roll occurs in the loading vehicle 10, the load of the turning inner wheel decreases according to a turning direction, increasing a load of a turning outer wheel. For example, in the left turning, the loads on the left front rear wheels 13FL and 13RL decrease while the loads on the right front rear wheels 13FR and 13RR increase. On the other hand, in the right turning, the loads on the right front rear wheels 13FR and 13RR decrease while the loads on the left front rear wheels 13FL and 13RL increase. This amount of change of the load changes according to a width-direction center-of-gravity position Gx, which is a center of gravity position of the loading vehicle 10 in the vehicle width direction, a turning speed, and a turning radius.

For example, during the center loading where the turning speed and the turning radius are constant and the loaded goods 12 are loaded at the center portion (including approximately center) of the vehicle width direction, as illustrated in FIG. 4, compared with a straight running rear wheel axle load WRS, which is the rear wheel axle load WR during the straight running braking, in a left turning rear wheel axle load WRL, which is the rear wheel axle load WR during the left turning braking, and in a right turning rear wheel axle load WRR, which is the rear wheel axle load WR during the right turning braking, the braking becomes slightly small. This is because of the following. During the center loading, even if the roll occurs in any of the right and left turnings, an influence of the width-direction center-of-gravity position Gx is small. However, a sinking of the deck 11 on the turning outer wheel side is large due to an increase in load to the turning outer wheel. A floating of the deck 11 on the turning inner wheel side becomes small due to a reduction in load on the turning inner wheel. At the center of the vehicle width direction, the deck 11 slightly sinks.

During the left side loading where the turning speed and the turning radius are constant and the loaded goods 12 are loaded on the left side from the center portion of the vehicle width direction, as illustrated in FIG. 5, compared with the straight running rear wheel axle load WRS, the left turning rear wheel axle load WRL becomes small, and the right turning rear wheel axle load WRR becomes large. This is because that during the left side loading, since the width-direction center-of-gravity position Gx is at the left side, the deck 11 has already sunk on the left side at the straight running. Therefore, when the roll occurs in the left turning, the sinking of the deck 11 on the turning outer wheel side due to the increase in load on the turning outer wheel is small. The float of the deck 11 on the turning inner wheel side due to the reduction in load on the turning inner wheel hardly occurs. The deck 11 sinks at the center of the vehicle width direction. When the roll occurs in the right turning, the sinking of the deck 11 on the turning outer wheel side due to the increase in load on the turning outer wheel hardly occurs. The float of the deck 11 on the turning inner wheel side due to the reduction in load on the turning inner wheel becomes large. The deck 11 floats at the center of the vehicle width direction.

During the right side loading where the turning speed and the turning radius are constant and the loaded goods 12 are loaded on the right side from the center portion of the vehicle width direction, as illustrated in FIG. 6, compared with the straight running rear wheel axle load WRS, the left turning rear wheel axle load WRL becomes large, and the right turning rear wheel axle load WRR becomes small. This is because that during the right side loading, since the width-direction center-of-gravity position Gx is at the right side, the deck 11 has already sunk on the right side at the straight running. Therefore, when the roll occurs in the left turning, the sinking of the deck 11 on the turning outer wheel side due to the increase in load on the turning outer wheel hardly occurs. The float of the deck 11 on the turning inner wheel side due to the reduction in load on the turning inner wheel becomes large. The deck 11 floats at the center of the vehicle width direction. When the roll occurs in the right turning, the sinking of the deck 11 on the turning outer wheel side due to the increase in load on the turning outer wheel becomes small. The float of the deck 11 on the turning inner wheel side due to the reduction in load on the turning inner wheel hardly occurs. The deck 11 sinks at the center of the vehicle width direction. Here, during the straight running braking, the LSPV 26 is disposed at the center (approximately center). Accordingly, the width-direction center-of-gravity position Gx is almost free from the influence from the loaded position of the loaded goods 12 in the vehicle width direction. Therefore, the estimated rear wheel axle load WRS during the straight running braking is approximately constant.

The ECU 3 determines the center of gravity condition of the vehicle in the vehicle width direction based on the estimated rear wheel axle load. The ECU 3 determines whether the center of gravity condition of the vehicle in the vehicle width direction is a half-loaded state that a loading state is any of the left side loading and the right side loading, based on at least two of the estimated straight running rear wheel axle load WRS, left turning rear wheel axle load WRL, and right turning rear wheel axle load WRR. The ECU 3, for example, determines the half-loaded state by a positive/negative and a magnitude of a difference between the straight running rear wheel axle load WRS and the left turning rear wheel axle load WRL, a difference between the straight running rear wheel axle load WRS and the right turning rear wheel axle load WRR, or a difference between the left turning rear wheel axle load WRL and the right turning rear wheel axle load WRR. The ECU 3 may determine the half-loaded state by the positive/negative and the magnitude of the left turning rear wheel axle load WRL and the right turning rear wheel axle load WRR to the straight running rear wheel axle load WRS. For example, in the case where the center of gravity condition of the vehicle in the vehicle width direction is determined by the difference between the left turning rear wheel axle load WRL and the right turning rear wheel axle load WRR (WRL-WRR), when the difference is 0 (approximately 0), the ECU 3 determines that the loading state is the center loading, when the difference is a negative value, the ECU 3 determines that the loading state is the left side loading, and when the difference is a positive value, the ECU 3 determines that the loading state is the right side loading.

The hardware of the ECU 3 is configured by a central processing unit (CPU), which mainly performs arithmetic operations, a memory for storing programs and information (RAM such as an SRAM and read only memory (ROM) such as an EEPROM), input/output interfaces, and the like. Since the hardware configuration is similar to that of the ECU mounted on the known loading vehicle 10, the detailed description is omitted. The ECU 3 is electrically connected to a driving device 4, which is an engine, a motor, and the like mounted to the loading vehicle 10 and causes driving power or the braking power to act on the loading vehicle 10, the above-described braking device 2, a steering gear 5 such as an electric power steering (EPS), and various sensors disposed at the loading vehicle 10, an accelerator pedal sensor, a brake pedal sensor (not illustrated), and the like. The ECU 3 can obtain information from each of the devices 2 and 4 and gear 5, for example, the front wheel brake pressure Pf, the rear wheel brake pressure Pr, and the driving power F. The ECU 3 can obtain a running state of the loading vehicle 10, for example, an acceleration A, and a running request, a braking request, and the like to the loading vehicle 10 by a driver from various sensors or the like as vehicle information. Here, the ECU 3 is electrically connected to sensors, the front wheel brake pressure sensor 27, the rear wheel brake pressure sensor 28, and the like, and each of the devices 2 and 4 and gear 5 by a communications system typified by, for example, a CAN communications system.

Next, the following describes the vehicle-center-of-gravity condition determining method by the vehicle-center-of-gravity condition determining apparatus according to the first embodiment. Here, the ECU 3 repeatedly performs the vehicle-center-of-gravity condition determining method at each preset control cycle.

First, the ECU 3, as illustrated in FIG. 3, calculates the gross vehicle weight Wm (Step ST11). Here, the ECU 3 calculates the gross vehicle weight Wm based on the antero-posterior acceleration Afr among the driving power F and the acceleration A of the loading vehicle 10 that the ECU 3 obtains. Subtracting a vehicle weight W and a vehicle occupant weight (value found by multiplying a count of vehicle occupants calculated by a seat sensor (not illustrated) by a predetermined weight) set to the specifications of the loading vehicle 10 from the gross vehicle weight Wm allows calculating an actual load capacity L loaded on the deck 11.

Next, the ECU 3 estimates the straight running rear wheel axle load WRS, which is the rear wheel axle load WR during straight running braking (Step ST12). Here, the ECU 3 estimates the straight running rear wheel axle load WRS based on the front wheel brake pressure Pf and the rear wheel brake pressure Pr when the front wheel brake pressure Pf where the rear wheel axle load property of the LSPV 26 based on the calculated load capacity L becomes the second-half-front-rear brake pressure distribution occurs and the rear wheel axle load property of the LSPV 26. That is, during the straight running braking, the ECU 3 determines whether the rear wheel axle load property of the LSPV 26 based on the calculated load capacity L generates predetermined front wheel brake pressure Pfx greater than the change point at which the brake pressure distribution changes from the first-half-front-rear brake pressure distribution to the second-half-front-rear brake pressure distribution occurs or not. When the ECU 3 determines that the front wheel brake pressure Pf greater than the change point occurs, the ECU 3 detects the current front wheel brake pressure Pf and rear wheel brake pressure Pr to estimate the straight running rear wheel axle load WRS. Here, considering the change in the right and left turning rear wheel axle loads WRL and WRR with respect to the straight running rear wheel axle load WRS, the predetermined front wheel brake pressure Pfx is preferable to be a slightly larger value than the front wheel brake pressure Pf at the change point based on the calculated load capacity L.

Next, the ECU 3 estimates the left turning rear wheel axle load WRL, which is the rear wheel axle load WR during the left turning braking (Step ST13). Here, during the left turning braking, the ECU 3 determines whether the detected front wheel brake pressure Pf is equal to or more than the predetermined front wheel brake pressure Pfx or not. When the ECU 3 determines that the front wheel brake pressure Pf is equal to or more than the predetermined front wheel brake pressure Pfx, the ECU 3 detects the current front wheel brake pressure Pf and rear wheel brake pressure Pr. The ECU 3 estimates the left turning rear wheel axle load WRL based on the detected front wheel brake pressure Pf and rear wheel brake pressure Pr and the rear wheel axle load property of the LSPV 26.

Next, the ECU 3 estimates the right turning rear wheel axle load WRR, which is the rear wheel axle load WR during the right turning braking (Step ST14). Here, during the right turning braking, the ECU 3 determines whether the detected front wheel brake pressure Pf is equal to or more than the predetermined front wheel brake pressure Pfx or not. When the ECU 3 determines that the front wheel brake pressure Pf is equal to or more than the predetermined front wheel brake pressure Pfx, the ECU 3 detects the current front wheel brake pressure Pf and rear wheel brake pressure Pr. The ECU 3 estimates the right turning rear wheel axle load WRR based on the detected front wheel brake pressure Pf and rear wheel brake pressure Pr and the rear wheel axle load property of the LSPV 26. To estimate the straight running rear wheel axle load WRS, the left turning rear wheel axle load WRL, and the left right turning rear wheel axle load WRR, among factors that change the loads on the right and left rear wheels 13RR and 13RL, conditions of the turning speed and the turning radius other than the width-direction center-of-gravity position Gx are preferably the identical (including approximately the identical).

Next, the ECU 3 detects the half-loaded state based on the estimated straight running rear wheel axle load WRS, left turning rear wheel axle load WRL, and right turning rear wheel axle load WRR (Step ST15). Here, the ECU 3 determines whether the half-loaded state occurs or not based on at least two of the estimated straight running rear wheel axle load WRS, left turning rear wheel axle load WRL, and right turning rear wheel axle load WRR. For example, from a difference between the left turning rear wheel axle load WRL and the right turning rear wheel axle load WRR (WRL−WRR), when the difference is 0 (approximately 0), the ECU 3 determines that the loading state is the center loading, when the difference is a negative value, the ECU 3 determines that the loading state is the left side loading, and when the difference is a positive value, the ECU 3 determines that the loading state is the right side loading.

As described above, in the case where the braking is performed in a state of at least two of during the straight running, during the right turning, or during the left turning, the vehicle-center-of-gravity condition determining apparatus 1 according to the embodiment estimates each of the rear wheel axle loads WRS, WRR, and WRL based on the relationship between the detected front and rear brake pressures Pf and Pr and the rear wheel axle load property of the LSPV 26. Then, the vehicle-center-of-gravity condition determining apparatus 1 determines the half-loaded state, which is the center of gravity condition of the vehicle in the vehicle width direction, based on the estimated rear wheel axle loads WRS, WRR, and WRL. This allows determining the half-loaded state based on properties of the existing device mounted to the loading vehicle 10. This allows the determination on the half-loaded state with a simple configuration, allowing calling driver's attention and the vehicle behavior control based on the half-loaded state.

Second Embodiment

Figure 7:
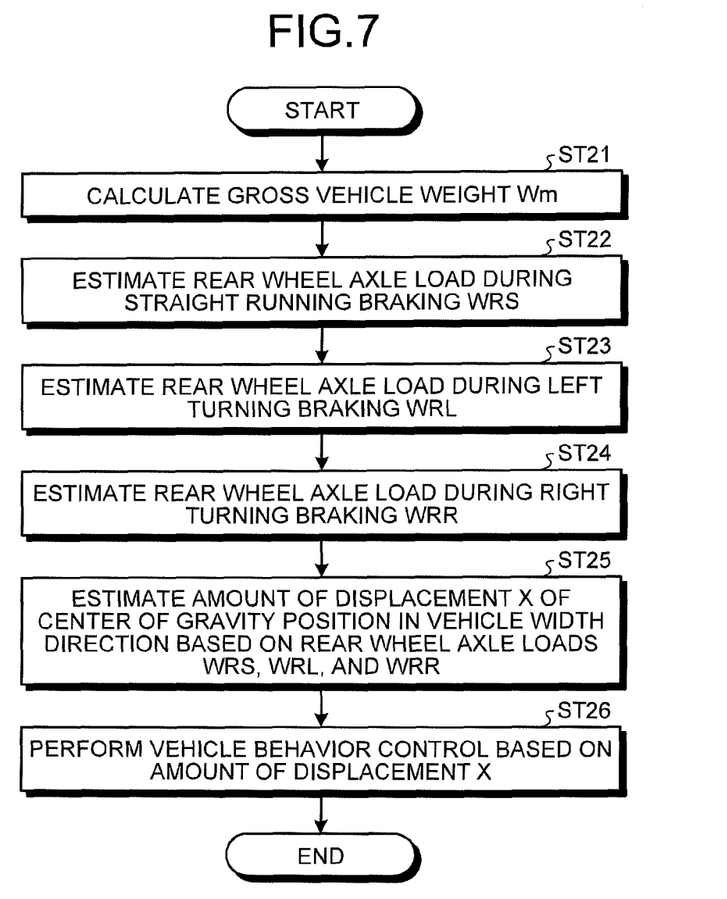
FIG. 7 is a flowchart of a vehicle behavior control method of a vehicle behavior control system according to a second embodiment.

The following describes a vehicle behavior control system according to the second embodiment. FIG. 7 is a flowchart of the vehicle behavior control method of a vehicle behavior control system according to a second embodiment. The vehicle behavior control system according to the second embodiment is basically configured as follows. The vehicle behavior control system is configured by including a vehicle behavior controller, in this embodiment, the vehicle behavior controller including at least the braking device 2 controlling the braking power, the driving device 4, the steering gear 5, or the like in the vehicle-center-of-gravity condition determining apparatus 1 according to the first embodiment.

The ECU 3 functions as a vehicle behavior controller. That is, the ECU 3 controls the braking power at least by the braking device 2 based on the center of gravity condition of the vehicle in the vehicle width direction, an amount of displacement X in this embodiment, to control the vehicle behavior. The vehicle behavior control includes the VSC control, the ABS control, and the like. Since the vehicle behavior control described in the left has already been publicly known, this embodiment omits the explanation.

The following describes the vehicle behavior control method by the vehicle behavior control system according to the second embodiment. In the vehicle behavior control method by the vehicle behavior control system according to the second embodiment, the explanation of a procedure similar to the vehicle-center-of-gravity condition determining method by the vehicle-center-of-gravity condition determining apparatus according to the first embodiment is omitted or simplified.

First, the ECU 3, as illustrated in FIG. 7, calculates the gross vehicle weight Wm (Step ST21) and estimates the straight running rear wheel axle load WRS (Step ST22). Then, the ECU 3 estimates the left turning rear wheel axle load WRL (Step ST23) and estimates the right turning rear wheel axle load WRR (Step ST24).

Next, the ECU 3 estimates the amount of displacement X of the center of gravity position of the estimated straight running rear wheel axle load WRS, left turning rear wheel axle load WRL, and right turning rear wheel axle load WRR in the vehicle width direction (Step ST25). Here, the ECU 3 estimates the amount of displacement X based on at least two of the estimated straight running rear wheel axle load WRS, left turning rear wheel axle load WRL and right turning rear wheel axle load WRR. For example, the ECU 3 estimates the amount of displacement X based on a difference between the left turning rear wheel axle load WRL, which is a first rear wheel axle load, and the right turning rear wheel axle load WRR, which is a second rear wheel axle load (WRL-WRR) and the gross vehicle weight Wm. Here, the amount of displacement X may be a distance to the center in the vehicle width direction. Alternatively, the amount of displacement X may be an index originated from the distance. For example, the index may be a plurality of levels set to increase as being laterally away of the center of the vehicle width direction. The ECU 3 may preliminary memorize a relationship of the difference between at least two of the estimated straight running rear wheel axle load WRS, left turning rear wheel axle load WRL, and right turning rear wheel axle load WRR and the gross vehicle weight Wm, a speed V related to the turning speed and the turning radius, a steering wheel angle δ, a lateral acceleration Gc, a yaw rate R, or the like in a map to estimate the amount of displacement X based on the difference of the estimated rear wheel axle load WR. In this case, the time for estimating the amount of displacement can be shortened, ensuring achieving the high-responsive vehicle behavior control.

Next, the ECU 3 performs the vehicle behavior control based on the estimated amount of displacement X (Step ST26). Here, the ECU 3 uses the estimated amount of displacement X as one of an input parameter for execution of the vehicle behavior control to perform the vehicle behavior control. That is, if the loading state is in a state determined as the half-loaded state, the ECU 3 performs the vehicle behavior control according to the extent of the half-loaded state.

As described above, the vehicle behavior control system according to the embodiment performs the vehicle behavior control based on the center of gravity condition of the vehicle in the vehicle width direction estimated by the vehicle-center-of-gravity condition determining apparatus 1, the amount of displacement X in this embodiment. Accordingly, the vehicle behavior system can appropriately perform the vehicle behavior control even in the case where the width-direction center-of-gravity position Gx is changed, the case of the half-loaded state during the vehicle behavior control, the case of the half-loaded state caused by a movement of the loaded goods during the vehicle behavior control, and the like. In particular, the vehicle behavior control considering the amount of displacement X allows early restraining a float of the loading vehicle 10 possibly generated during turning in the half-loaded state.

REFERENCE SIGNS LIST

1 Vehicle-center-of-gravity condition determining apparatus
2 Braking device
21 Master cylinder
22 Brake actuator
23R, 23L Right and left front wheel tube
24R, 24L Right and left rear wheel tube 25FL to 25RR Wheel cylinder
26 LSPV
27 Front wheel brake pressure sensor
28 Rear wheel brake pressure sensor
3 ECU
4 Driving device
5 Steering gear
10 Loading vehicle
11 Deck
12 Loaded goods
13FL to 13RR Wheel

The invention claimed is:

1. A vehicle-center-of-gravity condition determining apparatus, comprising:
a rear wheel brake pressure change unit configured to change rear wheel brake pressure according to a rear wheel axle load;
a front wheel brake pressure detector configured to detect brake pressure of a front wheel;
a rear wheel brake pressure detector configured to detect brake pressure of the rear wheel at a downstream side with respect to the rear wheel brake pressure change unit;
a rear wheel axle load estimating unit configured to estimate a rear wheel axle load based on a relationship between front and rear brake pressures detected during braking and a rear wheel axle load property of the rear wheel brake pressure change unit; and
a vehicle-center-of-gravity condition determiner configured to determine a center of gravity condition of a vehicle in a vehicle width direction based on the estimated rear wheel axle load, wherein
the rear wheel axle load estimating unit is configured to estimate each of the rear wheel axle loads in a case where braking is performed in a state of at least two of during straight running, during right turning, and during left turning.

2. The vehicle-center-of-gravity condition determining apparatus according to claim 1, wherein
the center of gravity condition of the vehicle in the vehicle width direction is an amount of displacement of a center of gravity position of a vehicle in the vehicle width direction,
the rear wheel axle load estimating unit is configured to estimate the rear wheel axle loads in a case where braking is performed in a state of during left turning and during right turning as respective first rear wheel axle load and second rear wheel axle load, and
the vehicle-center-of-gravity condition determining apparatus is configured to estimate the amount of displacement of the center of gravity position of the vehicle in the vehicle width direction based on the first rear wheel axle load and the second rear wheel axle load.

3. A vehicle behavior control system, comprising:
a vehicle-center-of-gravity condition determining apparatus including:
a rear wheel brake pressure change unit configured to change rear wheel brake pressure according to a rear wheel axle load;
a front wheel brake pressure detector configured to detect brake pressure of a front wheel;
a rear wheel brake pressure detector configured to detect brake pressure of the rear wheel at a downstream side with respect to the rear wheel brake pressure change unit;
a rear wheel axle load estimating unit configured to estimate a rear wheel axle load based on a relationship between front and rear brake pressures detected during braking and a rear wheel axle load property of the rear wheel brake pressure change unit; and
a vehicle-center-of-gravity condition determiner configured to determine a center of gravity condition of a vehicle in a vehicle width direction based on the estimated rear wheel axle load, wherein
the rear wheel axle load estimating unit is configured to estimate each of the rear wheel axle loads in a case where braking is performed in a state of at least two of during straight running, during right turning, and during left turning; and
a vehicle behavior controller configured to control at least braking power based on the center of gravity condition of the vehicle in the vehicle width direction to control a vehicle behavior.

4. The vehicle behavior control system according to claim 3, wherein
the center of gravity condition of the vehicle in the vehicle width direction is an amount of displacement of a center of gravity position of a vehicle in the vehicle width direction,
the rear wheel axle load estimating unit is configured to estimate the rear wheel axle loads in a case where braking is performed in a state of during left turning and during right turning as respective first rear wheel axle load and second rear wheel axle load, and
the vehicle-center-of-gravity condition determining apparatus is configured to estimate the amount of displacement of the center of gravity position of the vehicle in the vehicle width direction based on the first rear wheel axle load and the second rear wheel axle load.

5. A vehicle-center-of-gravity condition determining method, comprising:
a step of changing rear wheel brake pressure according to a rear wheel axle load;
a step of detecting brake pressure of a front wheel;
a step of detecting brake pressure of the rear wheel at a downstream side with respect to a rear wheel brake pressure change unit, the rear wheel brake pressure change unit being configured to change brake pressure of a rear wheel according to the rear wheel axle load;
a step of estimating a rear wheel axle load based on a relationship between front and rear brake pressures detected during braking and a rear wheel axle load property of the rear wheel brake pressure change unit; and
a step of determining a center of gravity condition of a vehicle in a vehicle width direction based on the estimated rear wheel axle load, wherein
the rear wheel axle load is estimated in a case where braking is performed in a state of at least two of during straight running, during right turning, and during left turning.

* * * * *